June 15, 1948.   L. G. SAGEN   2,443,272
SELF-ALIGNING JOINT FOR ENGINE EXHAUST
Filed July 26, 1945   2 Sheets—Sheet 1

Inventor
LAWRENCE G. SAGEN
By Clarence A. O'Brien
and Harvey B. Jacobson
Attorneys June 15, 1948.  L. G. SAGEN  2,443,272
SELF-ALIGNING JOINT FOR ENGINE EXHAUST
Filed July 26, 1945
FIG.-6
FIG.-5
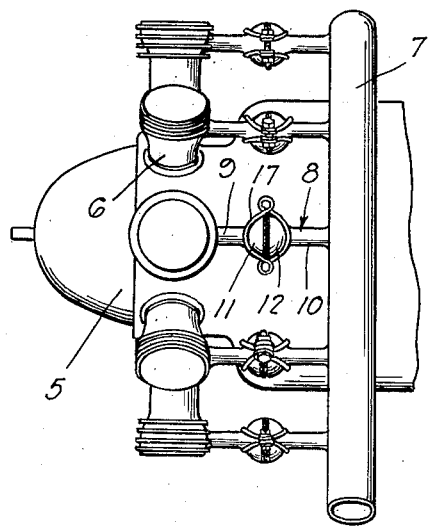
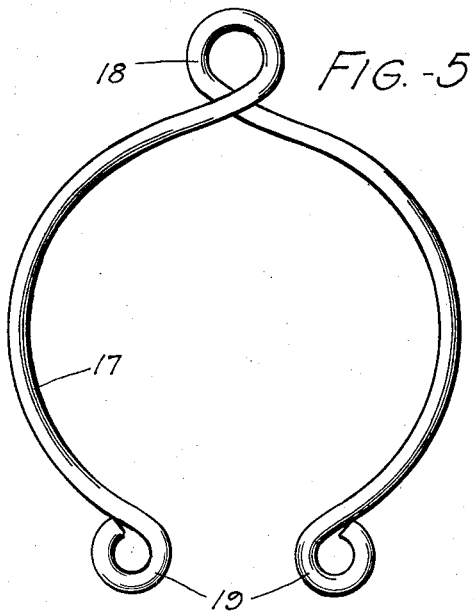
FIG.-3
FIG.-4
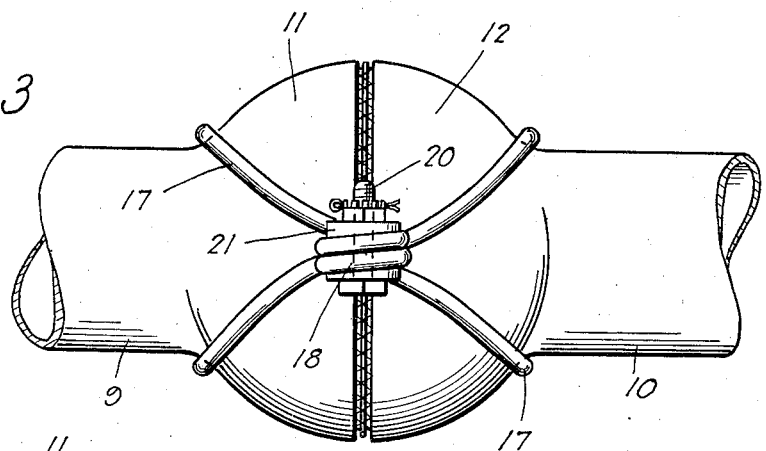
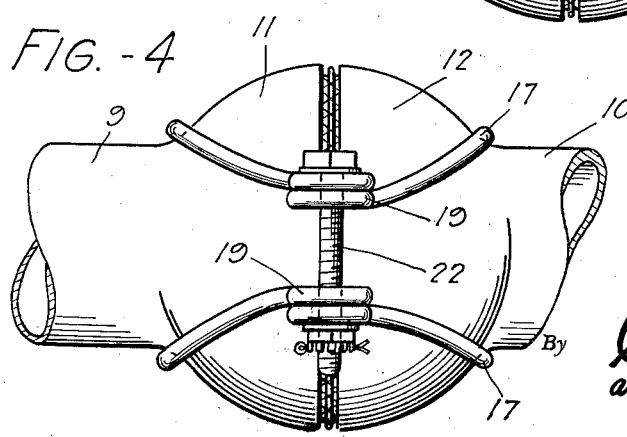
*Inventor*
LAWRENCE G. SAGEN
By *Clarence A. O'Brien
and Harvey B. Jacobson*
*Attorneys*

Patented June 15, 1948

2,443,272

UNITED STATES PATENT OFFICE 2,443,272

SELF-ALIGNING JOINT FOR ENGINE EXHAUSTS

Lawrence G. Sagen, Auburn, N. Y.

Application July 26, 1945, Serial No. 607,201

5 Claims. (Cl. 285—91)

The present invention relates to new and useful improvements in joint for exhaust manifold system and particularly to joints or connections for use in manifold systems of aircraft engines.

Considerable difficulty has been experienced in providing a safe and effective joint in the engine exhaust stack connecting the cylinders of radial engines to an exhaust manifold or collecting ring, a rigid joint between the engine cylinders and the collecting ring having been found impracticable and it is accordingly an object of the present invention to provide a self-aligning joint in the exhaust stack leading from the engine cylinder to the collecting ring and by means of which an easy and quick assembly and disassembly of the exhaust system is provided to thus expedite repairs and maintenance.

A further object of the invention is to provide a ball and socket joint in the exhaust stack leading from the engine cylinder together with novel means for securing the ball in its sockets adapted to absorb vibration between the engine and the collecting ring and at the same time to provide an effective exhaust gas seal at the joint.

A still further object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a view in elevation showing the wire connecting clamps at one side of the joint.

Figure 4 is a similar view showing the tightening screw for the connecting clamps at the other side of the joint.

Figure 5 is an enlarged view in elevation of one of the wire clamps.

Figure 6 is a fragmentary side elevational view of an engine showing the self-aligning joint between the cylinders and the collecting ring.

Figure 1:
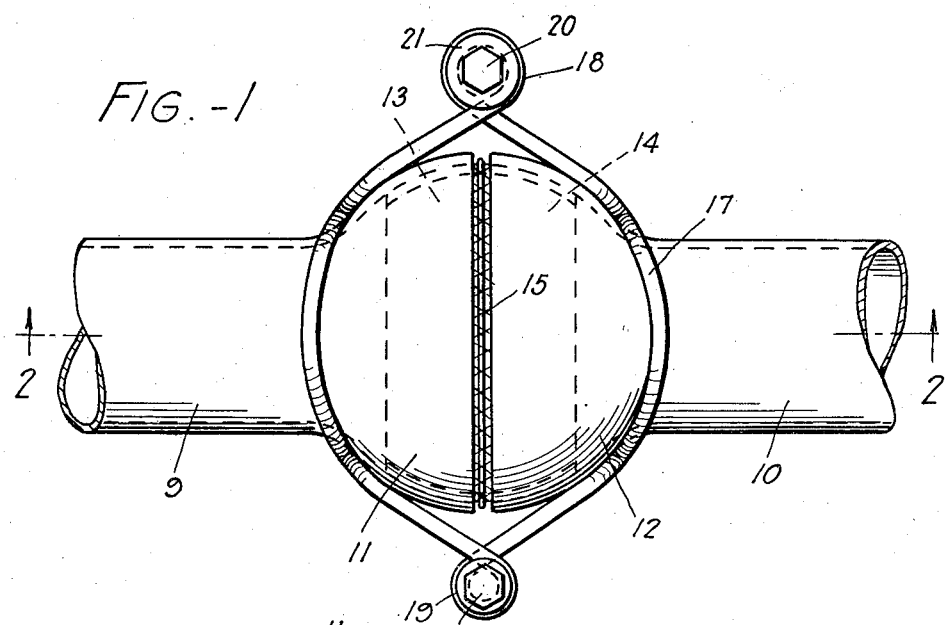
Figure 1 is a side elevational view of the joint.
Figure 2:
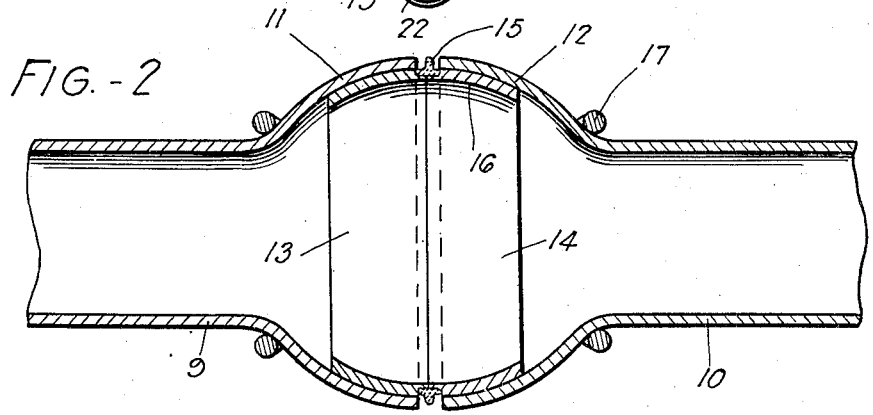
Figure 2 is a longitudinal sectional view taken substantially on the line 2—2 of Figure 1.
Figure 7:
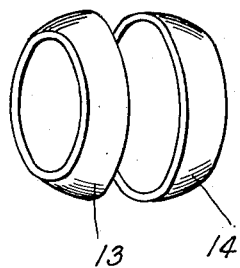
Figure 7 is a group respective view of the pair of rings forming the ball prior to their connection to each other.
Figure 8:
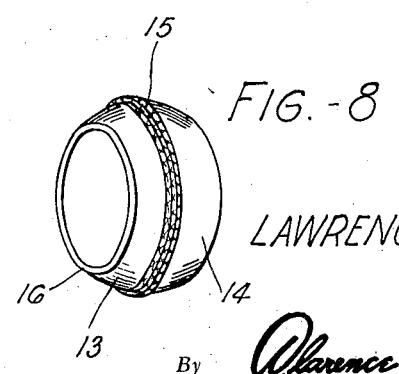
Figure 8 is a similar view showing the rings connected together to form the ball.

Referring now to the drawings in detail wherein for the purpose of illustration I have disclosed a preferred embodiment of the invention the numeral 5 designates a conventional form of radial type airplane engine including the cylinders 6 connected to the exhaust collecting ring 7 by means of the exhaust stacks 8. The stacks 8 include a pipe section 9 connected to the engine cylinder and a pipe section 10 connected to the collecting ring 7. The adjacent ends of the pipe section forming the stack are constructed with flared semi-spherical or concavo-convex sockets 11 and 12 with their edges slightly spaced apart from each other as indicated more clearly in Figure 2 of the drawings.

A pair of tapering or concavo-convex rings 13 and 14 having rounded peripheries are welded at their larger ends to each other as indicated at 15 to provide a frustum of a ball 16 open at opposite ends or an oppositely tapered spherical ring with flat parallel open ends and adapted for conformably and snugly fitting in the sockets 11 and 12. The rings 13 and 14 are relatively thin walls of uniform cross-section throughout so as to provide a joint of light weight.

The welding 15 provides a circumferentially extending rib on the outer surface of the ball which is positioned between the adjacent ends of the sockets 11 and 12, the edges of the rib being slightly spaced from the inner edges of the sockets to provide limited movement between the edges of the sockets and the rib 15 on the ball for self-alignment of the pipe sections 9 and 10 of the exhaust stack 8.

The circumferential extending rib 15 on the ball prevents working of the ball in the sockets in a direction to partially close the pipe sections 9 and 10 of the stacks and thus prevent blocking of the exhaust passage and causing back pressure in the cylinder.

Sockets 11 and 12 are secured in position on the ball 16 by means of a pair of wire clamping members in the form of split rings 17 of spring wire construction, each of the clamping members being formed of a length of spring wire crossed and looped with an eye or spring coil 18 intermediate their ends and bent outwardly in opposite directions in semi-circular formation to form an open ring with eyes 19 at the ends thereof. The pair of clamping members are positioned at oppostie sides of the sockets 11 and 12 with the eyes 18 of the clamps aligned to receive a bolt 20, tapered washers 21 being positioned on the bolt at the opposite sides of the eyes 18 as indicated at Figure 3 of the drawings.

The eyes 19 at the ends of the clamping members are also aligned by springing them together at the opposite side of the sockets 11 and 12 and are connected by a bolt 22 which serves to draw the eyes 19 toward each other to thus tightly clamp the spring wire clamping members 17 at the opposite sides of the sockets in the manner as illustrated in Figure 4 of the drawings.

The clamping members thus provide a tight seal between the ball 16 and the sockets 11 and 12 whereby to prevent escape of the exhaust gases through the joint.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. A self-aligning joint for the exhaust stack of an engine and comprising a pair of pipe sections in end to end relation, sockets at the adjacent ends of the sections with the edges of the sockets spaced from each other, a ball of thin uniform cross-section seated in the sockets and open at opposite sides to provide a passage therethrough, a circumferentially extending rib on the ball projecting between the spaced ends of the sockets to maintain the ball against rotation in a direction to close the passage, and means for connecting the sockets and ball in assembled relation comprising a pair of connected resilient split rings having intermediate and end eyes disposed in opposed aligned positions and connections between said aligned eyes.

2. A self-aligning joint for the exhaust stack of an engine and comprising a pair of pipe sections in end to end relation, sockets at the adjacent ends of the sections with the inner edges of the sockets spaced from each other, a ball seated in the sockets and open at opposite sides to provide a passage therethrough, means carried by the ball and projecting peripherally between the spaced edges of the sockets in spaced relation to said edges to limit the relative angular movements of the pipe sections and sockets at their inner edges with respect to each other and the ball and maintain the ball against movement in a direction to close the passage, and a pair of resilient wire clamps positioned at diametrically opposite sides of the sockets and connected to each other in clamping engagement to secure the sockets and ball in assembled position.

3. A self-aligning joint for the exhaust stack of an engine and comprising a pair of pipe sections in end to end relation, sockets at the adjacent ends of the sections with the edges of the sockets spaced from each other, a ball seated in the sockets and open at opposite sides to provide a passage therethrough, means carried by the ball and projecting between and in spaced relation to the spaced edges of the sockets to maintain the ball against movement in a direction to close the passage, a pair of split annular resilient wire clamps positioned at diametrically opposite sides of the sockets, eyes at the intermediate portions and at the ends of said clamps adapted for aligning, and bolts inserted in the aligned eyes to draw the clamps together on the sockets.

4. A self-aligning joint for the exhaust stack of an engine comprising a pair of pipe sections in end to end relation, semi-spherical sockets at the adjacent ends of the sections with the edges of the sockets spaced from each other, a pair of tapering concavo-convex rings joined to each other at their larger inner edges to form a ball open at opposite sides and adapted for seating in the sockets, the outer ends of the rings being larger than the pipe sections at their juncture with the sockets at their outer portions so as to lie outwardly of the bores of the pipe sections entirely and within the sockets in considerably spaced relation to the outer portions of the sockets, said joined edges of the rings being formed with an intermediate circumferentially extending rib on the ball projecting between and in spaced relation to the spaced inner ends of the sockets to maintain the ball against rotation in a direction to close the stack, resilient split rings disposed on the ball at opposite sides and seated on the pipe sections at the junctures thereof with the sockets, and bolts connecting said rings at diametrically opposite points in alignment with the spaced ends and rib.

5. A self aligning joint for the exhaust stacks of engines, comprising a pair of pipe sections in end to end relation, flared semi-spherical sockets at the adjacent ends of the sections with the edges of the sockets spaced from each other, a frustum of a ball seated in the sockets and open at opposite sides to provide a passage therethrough, said ball comprising oppositely tapered rings having rounded peripheries and their inner ends larger than their outer ends and joined together, a projection on the ball at the joint positioned between the spaced ends of the sockets to maintain the ball against rotation in a direction to close the passage, a pair of connected resilient split rings engaged on the sockets at the juncture of the pipe sections therewith and comprising split spring wire lengths crossed and looped to form an intermediate eye and bent outwardly in opposite directions in semi-circular formation to form an open ring with eyes at the ends thereof sprung together into alignment and means to connect the aligned intermediate and end eyes.

LAWRENCE G. SAGEN.

REFERENCES CITED

The following references are of record in the file of this patent:

UNITED STATES PATENTS

| Number | Name | Date |
|---|---|---|
| 693,367 | Brooke | Feb. 18, 1902 |
| 969,422 | Tanner et al. | Sept. 6, 1910 |
| 1,561,033 | Spencer | Nov. 10, 1925 |

FOREIGN PATENTS

| Number | Country | Date |
|---|---|---|
| 644,735 | Germany | Apr. 7, 1935 |